United States Patent Office 3,420,068
Patented Jan. 7, 1969

3,420,068
PROCESS FOR THE PRODUCTION OF A FLUID RICH IN METHANE FROM LIQUEFIED NATURAL GAS UNDER A LOW INITIAL PRESSURE
Pierre Petit, Chatenay-Malabry, France, assignor to L'Air Liquide, Societe Anonyme Pour l'Etude et l'Exploitation des Procedes Georges Claude, a company
Filed Aug. 28, 1967, Ser. No. 663,857
Claims priority, application France, Sept. 13, 1966, 76,149; May 29, 1967, 108,256
U.S. Cl. 62—23                5 Claims
Int. Cl. F25j *3/00*

ABSTRACT OF THE DISCLOSURE

Process for the production of a liquid or a gas rich in methane from liquefied natural gas under a low pressure wherein the LNG is subjected to a first partial revaporisation providing a first gaseous fraction enriched in methane, and a residual liquid fraction which is subjected to a second partial vaporisation under a higher pressure, which provides a second gaseous fraction enriched in methane. The first gaseous fraction is reliquefied in heat exchange with the LNG undergoing a warming up, and the second gaseous fraction in heat exchange with the LNG undergoing the first partial vaporisation.

---

This invention relates to a process for the production of a fluid rich in methane from liquefied natural gas under a low initial pressure.

When it is desired to obtain a fluid rich in methane, free from at least some of the hydrocarbons heavier than methane, viz. ethane, propane, the butanes and pentanes, which are frequently contained in the liquefied natural gas, it is necessary to carry out a partial vaporisation of the liquefied natural gas under a moderate pressure to produce a gaseous fraction rich in methane and a liquid fraction, and preferably to subject the liquid fraction, which is enriched with heavy hydrocarbons, to a separation process in order to produce a further quantity of a gas rich in methane and a liquid fraction further enriched with the heavy hydrocarbons; the further quantity of gas rich in methane, which is thus separated, is re-united with the gas rich in methane, which was produced by the partial vaporisation of the original quantity of liquefied natural gas, and is compressed with the latter to a desired high final pressure. However, the compression of the gas rich in methane requires an expenditure of energy.

It is possible to a certain extent to use the cold contained in the liquid natural gas to bring about the re-liquefaction of the gas rich in methane and to bring the re-liquefied gas rich in methane to the final high pressure by pumping before re-heating it to the ambient temperature, thereby resulting in a specific energy consumption which is lower than in the procedure described above. However, since the gas rich in methane is more volatile than the natural gas itself, there is available for this purpose only the heat from the re-heating of the liquid natural gas, excluding its heat of vaporisation, and the former only permits of the re-liquefaction of just a part of the gas rich in methane to be assured. The other part of the gas rich in methane must still be compressed in the gaseous state, so that the energy consumption of the process cannot be kept as low as desirable and it is still necessary to have a high capacity gas compressor.

It is an object of the present invention to overcome the aforesaid disadvantages and to re-liquefy a large amount of the gas rich in methane which is separated from the liquefied natural gas.

The reliquefied gas rich in methane can then be all brought in the liquid state to a high final pressure, if desired, with a low energy consumption, for example, for the supply of a pipeline for conveying the gas to industrial or domestic customers. In other cases, on account of great seasonal fluctuations in the consumption of gas rich in methane for domestic use, it is desirable to keep in reserve the gas rich in methane in the liquid state under a low pressure, in order to permit a supplementary supply of this gas to be supplied to different centers of consumption. The reliquefied gas rich in methane is then to be expanded before being added to the liquid reserve.

Accordingly, the present invention provides a process for the production of a liquid rich in methane from liquefied natural gas under a low initial pressure, wherein at least part of the hydrocarbons heavier than methane is separated in a residual liquid fraction of the partial revaporisation of the natural gas previously brought in the liquid state to a higher pressure than said low initial pressure. Said process is characterized by the following steps:

(a) Liquefying a first quantity of gas rich in methane under a first pressure higher than said initial pressure at least partly by heat exchange with sub-cooled liquefied natural gas brought to said first pressure undergoing a warming up;

(b) Liquefying another quantity of gas rich in methane brought to a second pressure higher than said first pressure at least partly by heat exchange with liquefied natural gas still under said first pressure undergoing a partial revaporisation providing a first gaseous fraction and a first liquid fraction, said first gaseous fraction constituting said first quantity of gas rich in methane;

(c) Bringing said first liquid fraction to at least said second pressure; and (d) Separating said first liquid fraction into a second gaseous fraction and a second liquid fraction, said second gaseous fraction constituting said second quantity of gas rich in methane and said second liquid fraction containing at least part of the hydrocarbons heavier than methane.

In one embodiment of the invention, when the gas rich in methane is to be supplied under a high pressure, two liquefied quantities of gas rich in methane are brought to a final pressure higher than the pressure under which said quantities were liquefied.

Preferably, in another embodiment of the invention, the two liquefied quantities of gas rich in methane are brought to a final pressure higher than the pressures under which said quantities were liquefied; said second liquid fraction is separated by rectification in a rectification zone into rectified fractions; and the two quantities of fluid rich in methane, under said final pressure, are warmed up by heat exchanger with said rectification zone, thereby providing at least part of the cold input into said rectification zone.

When it is desired to keep in reserve the gas rich in methane in the liquid state under a low pressure, according to still another embodiment of the invention, the quantities of gas rich in methane are supplied with an external cold input for completing their liquefaction, and the liquefied quantities are at least in part expanded and supplied to a liquid store at low temperature. The external cold input can be provided at least in part by heat exchange with the fluid of an auxiliary refrigeration cycle. When there is also to be supplied natural gas under a high pressure from which the heavier hydrocarbons than methane are not to be removed, the external cold input is preferably provided by a warming up of a stream of said natural gas in the sub-cooled liquefied state.

For a better understanding of the invention and to show how the same may be carried into effect, reference will now be made, by way of example, to the accompanying drawings in which.

Figure 1:
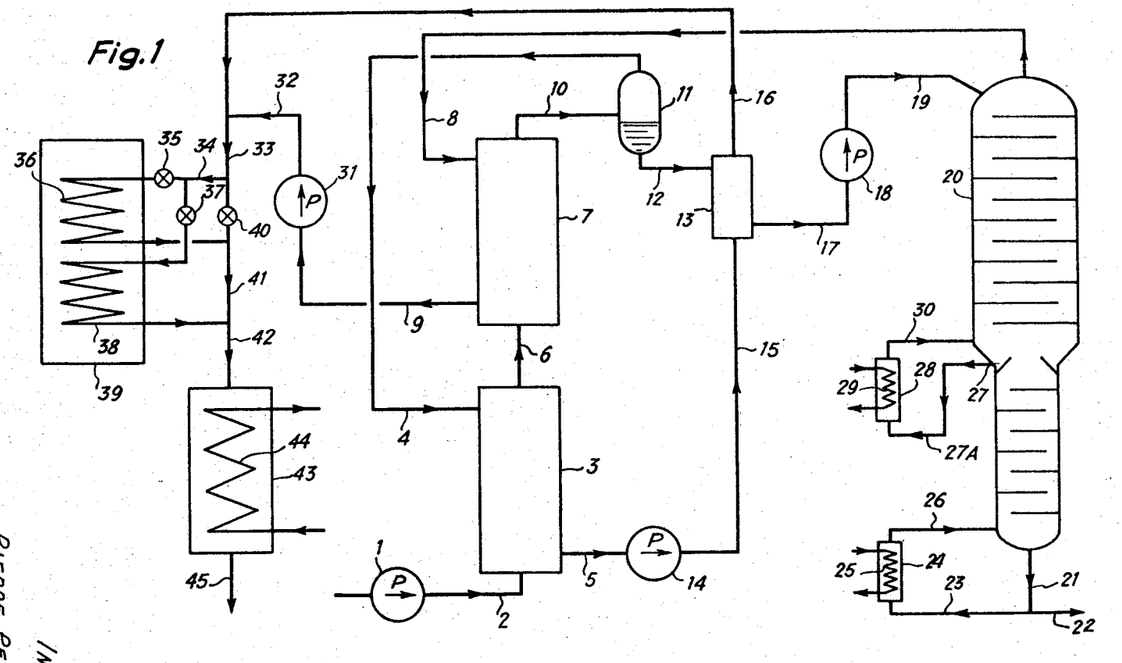
FIGURE 1 shows an installation for the production of gas rich in methane under high pressure, in which the gas rich in methane is reliquefied under two intermediate pressures before being brought to the final pressure of 70 bars absolute.

In the installation shown in FIGURE 1, the liquid natural gas under substantially atmospheric pressure is brought by a pump 1 to a pressure of about 18 bars absolute and is delivered through a conduit 2 to a heat exchanger 3. In the heat exchanger 3, it is warmed up without vaporisation by indirect heat exchange with a gas rich in methane which enters brought a conduit 4 at 18 bars absolute and is discharged in the liquid state through a conduit 5. The re-heated liquid natural gas is sent through a conduit 6 to a heat exchanger 7, where it undergoes a partial vaporisation in heat exchange with a gas rich in methane at a pressure of 25 bars absolute, which gas arrives from a rectifying column 20 through a conduit 8 and is discharged from the heat exchanger 7 in the liquid state through a conduit 9. The partially vaporised natural gas is then introduced through a conduit 10 into a separator 11.

In the separator 11, the vaporised gas rich in methane, which forms about 40% by weight of the initial liquid natural gas, is discharged at the upper end and is introduced by way of the conduit 4 into the heat exchanger 3. The residual liquid natural gas enriched with heavier hydrocarbons is withdrawn through a conduit 12, is sub-cooled in a heat exchanger 13 by heat exchange with the methane arriving from a pump 14 via a conduit 15 under a pressure of 70 bars, and then passes through a conduit 17 to a pump 18, which subjects it to a pressure of 25 bars absolute. It then passes by way of a conduit 19 into the top of the rectifier column 20, which ensures the partial extraction of the heavier hydrocarbons from the methane.

The column 20 comprises boilers 24 and 28, which are disposed at its base and in its middle portion, respectively. Of the liquid rich in heavier hydrocarbons drawn off from the base of column 20 via a conduit 21, one part is sent through a conduit 22 to a heavier hydrocarbons separation installation (not shown), and the other part passes through a conduit 23 to the boiler 24, is vaporised therein in contact with a coil 25 through which steam or water is passed, and then passes through a conduit 26 to the base of the column. Similarly, in the middle portion of the column, the liquid collected in troughs 27 passes through a conduit 27A to the boiler 28, is vaporised therein in contact with a coil 29 through which water is circulated, and then passes through a conduit 30 into the column.

Gas rich in methane is discharged at the top of the column 20, and is passed through the conduit 8 to the heat exchanger 7, where it is re-liquefied in heat exchange with the liquid natural gas under a pressure of 18 bars undergoing partial vaporisation. The liquefied gas rich in methane is sent through the conduit 9 to a pump 31, which subjects it to the final pressure of 70 bars absolute. The fluid rich in methane, under this hypercritical pressure, is then re-united by way of a conduit 32 with the first part of the fluid rich in methane, also under a pressure of 70 bars, arriving from the heat exchanger 13 through a conduit 16.

This first part of the gas rich in methane, which has been re-liquefied in the heat exchanger 3 and then brought to a pressure of 70 bars by the pump 14, has first been sent through the conduit 15 to the heat exchanger 13 thereby ensuring the sub-cooling of the liquid fraction from the separator 12 at the inlet of the pump 18; it is then, as noted above, combined via the conduit 16 with the other part of the methane arriving via the conduit 32.

The whole of the fluid rich in methane under the hypercritical pressure of 70 bars then passes through conduits 33 and 34 to the condensers of a heavier hydrocarbons separation installation, shown diagrammatically at 36 and 38 in a heat exchange zone 39. Valves 35 and 37 regulate the respective rates of flow in the heat exchange elements 36 and 38, while a valve 40, serving the purpose of a by-pass, permits, in certain circumstances, only a part of the total rate of flow of fluid rich in methane to pass into the heat exchange zone 39. At the outlet from the latter, the fluid rich in methane, already mainly re-heated and combined in conduits 41 and 42, experiences a final reheating to ambient temperature in a heat exchanger 43, which comprises a nest of tubes, indicated diagrammatically at 44, in which a re-heating fluid, for example water, is circulating. The resulting fluid rich in methane and under pressure is then sent through a conduit 45, either to the place of use or to a pipeline.

Figure 2:
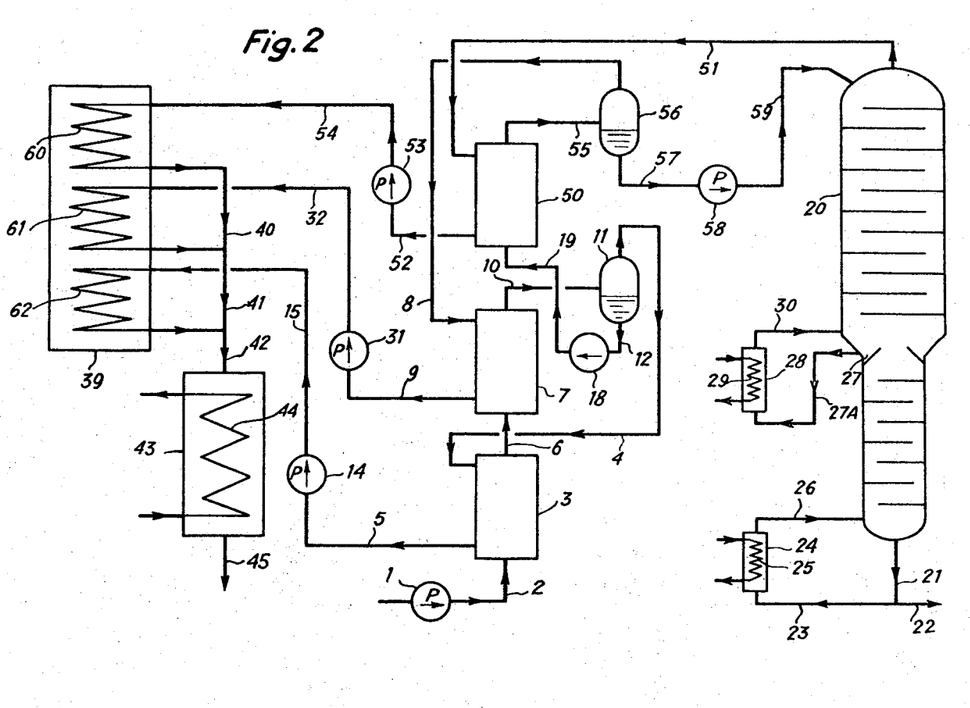
FIGURE 2 shows an installation of the same type, in which the gas rich in methane is reliquefied under three intermediate pressures before being brought to the same final pressure.

The installation shown in FIGURE 2 is similar in many respects to that of FIGURE 1, and the common elements will not be described again in detail. However, the gas rich in methane is re-liquefied therein at three intermediate pressure levels, instead of two. For this purpose, the liquid natural gas is subjected by a pump 1 to a first intermediate pressure of about 10 bars absolute before being re-heated without vaporisation in a heat exchanger 3 in counter-current with a first quantity of the gas rich in methane undergoing reliquefaction, which arrives by way of the conduit 4, and is discharged by way of a conduit 5. The liquid natural gas undergoes a partial vaporisation in the heat exchanger 7, in counter-current with a second quantity of gas rich in methane to be re-liquefied, which gas arrives by way of conduit 8 and is discharged through conduit 9. The partially vaporised natural gas passes through a conduit 10 into a separator 11. The gas rich in methane, discharged from the top of the latter, passes through the conduit 4 to the heat exchanger 3, which it leaves in re-liquefied form through the conduit 5. It is then delivered by the pump 14 at the final pressure of 70 bars into the conduit 15.

The residual liquid natural gas is withdrawn from the separator 11 through a conduit 12 and is then subjected by a pump 18 to a second intermediate pressure of 18 bars absolute. It is sent through the conduit 19 to a heat exchanger 50, where it undergoes a further partial vaporisation in heat exchange with a gas rich in methane, which arrives by way of a conduit 51 and is discharged in reliquefied form by way of a conduit 52. It then passes through a conduit 55 into a separator 56. The gas rich in methane which is discharged from the top of the separator 56 is sent through the conduit 8 to the heat exchanger 7 where it is re-liquefied before being introduced through the conduit 9 into the pump 31, which subjects it to the final pressure of 70 bars.

The residual liquid drawn off at the base of the separator 56 through a conduit 57 is brought by a pump 58 to a third intermediate pressure of 25 bars absolute and is introduced through a conduit 59 into the top of a rectifier column 20. This latter functions in the manner described with reference to FIGURE 1. It ensures the partial removal of hydrocarbons heavier than methane from the natural gas, which are eliminated in the liquid fraction sent through the conduit 22 to the heavier hydrocarbons separation installation. The gas rich in methane discharged from the top of the column through the conduit 51 passes to the heat exchanger 50 in order to be reliquified therein, whereafter it passes through the conduit 52 to a pump 53, which subjects it to the final pressure of 70 bars.

The three parts of the fluid rich in methane under a pressure of 70 bars, delivered by the pumps 14, 31 and 53 into the conduits 15, 32 and 54, respectively, are then sent by way of the conduits 15, 32 and 54 respectively to the condensers of a heavier hydrocarbons separation installation, shown diagrammatically at 60, 61 and 62 in a heat exchange zone 39. These parts of the fluid rich in methane are re-combined, after re-heating, through the conduits 40 and 41, and are passed through the conduit 42 into the heat exchanger 43. The resulting fluid rich in methane at a pressure of 70 bars and at ambient temperature is then discharged through a conduit 45.

Figure 3:
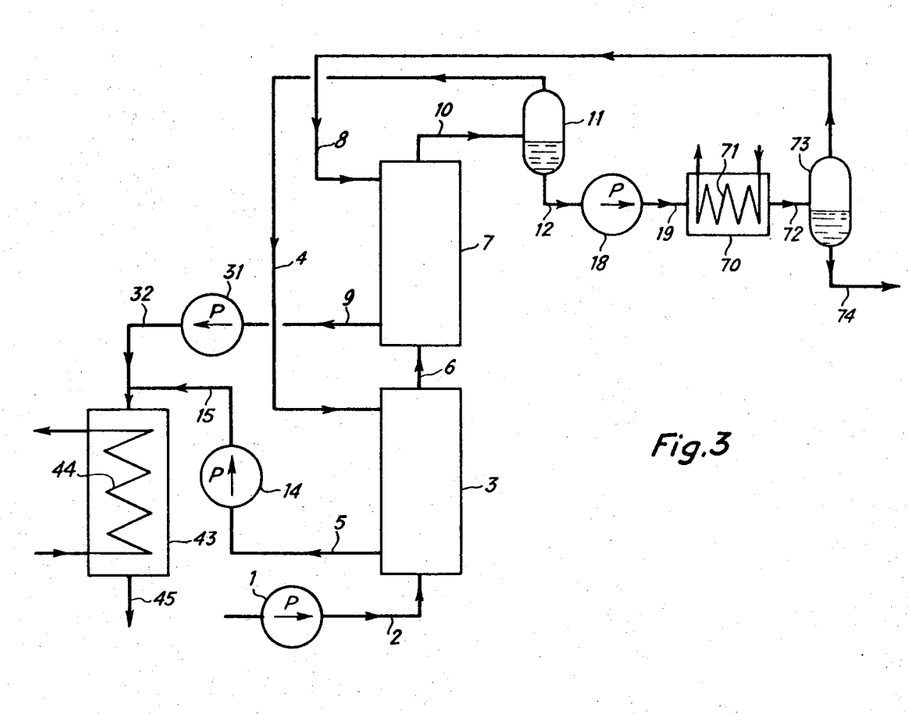
FIGURE 3 shows an installation for the production at 70 bars absolute of fluid rich in methane, but with reduced amounts of propane, butanes and pentanes with respect to the available natural gas, with elimination of the residual liquid fraction highly enriched in propane, butanes and pentanes, without separation of these hydrocarbons from one another.

The installation shown in FIGURE 3 ensures a partial separation of the propane, butanes and pentanes and heavier hydrocarbons contained in the liquefied natural gas with a view to adjusting its calorific value to the desired value. The liquid natural gas is brought by the pump 1 to a pressure of 20 bars absolute and is delivered through the conduits 2 into the heat exchanger 3, where it is re-heated to the region of its boiling point, in heat exchange with the gas rich in methane discharged from the separator 11 through the conduit 4. It then passes through the conduit 6 into the heat exchanger 7 where it experiences a partial vaporisation in heat exchange with the gas rich in methane and ethane discharged from a separator 73 through the conduit 8. It then passes through the conduit 10 into the separator 11. The gas rich in methane discharged through the conduit 4 is re-liquefied in the heat exchanger 3 and then sent through the conduit 5 to the pump 14, which brings it to the final pressure of 70 bars. After addition by way of the conduit 32 of fluid from the heat exchanger 7, the origin of which will be hereinafter referred to, it is re-heated to ambient temperature in the heat exchanger 43, in heat exchange with a nest of water tubes shown diagrammatically at 44, and sent by way of the conduit 45 to a gas pipeline system.

The liquid withdrawn from the separator 11 passes through the conduit 12 and the pump 18, which brings it to a pressure of 30 bars absolute, and then it travels through the conduit 19 to a heat exchanger 70 in which it is heated by a fluid circulated through a coil 71. Partially vaporised, it is introduced through a conduit 72 into the separator 73. A residual liquid fraction, highly enriched with propane, butanes and pentanes, is withdrawn through conduit 74 and eliminated, for example by combustion. A gas rich in methane and ethane is discharged from the top of the separator 73 through the conduit 8. It is re-liquified in the heat exchanger 7, in heat exchange with the natural gas undergoing partial re-vaporisation, and is then sent through the conduit 9 to the pump 31, which brings it to the final pressure of 70 bars. It is finally re-united by way of the conduit 32 with the fluid delivered through the conduit 15 before being re-heated with the latter in the heat exchanger 43 to ambient temperature and discharged under pressure as a fluid rich in methane through the conduit 45.

Figure 4:
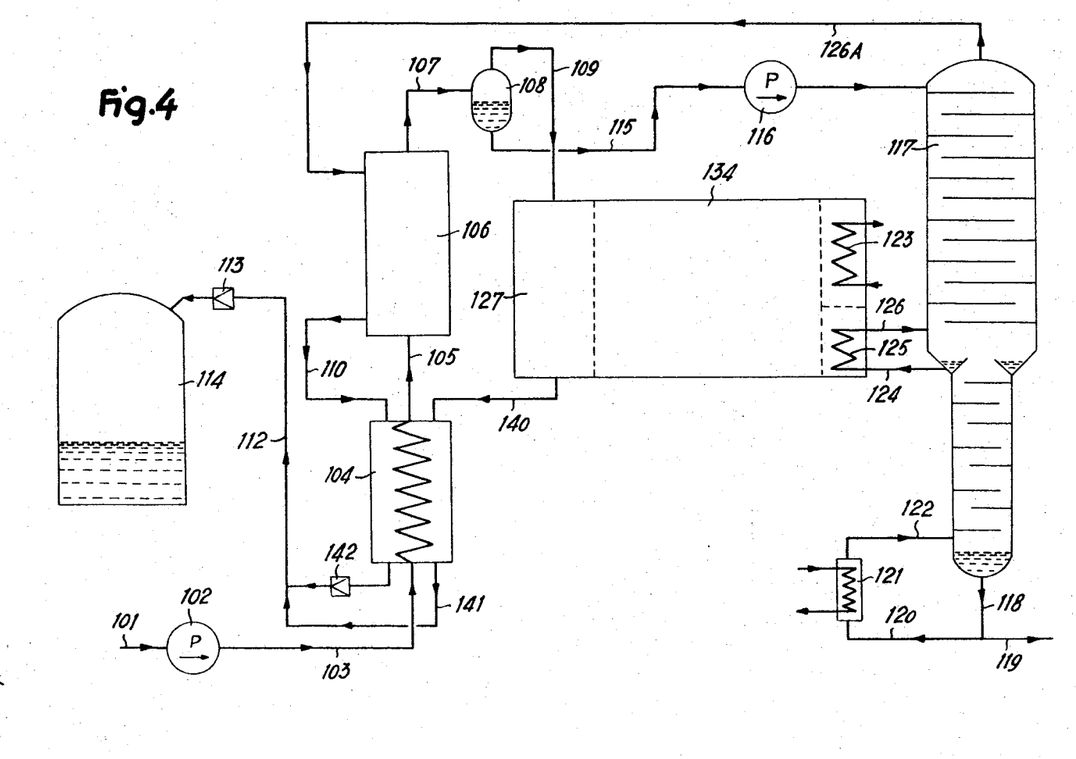
FIGURE 4 shows an installation in which all the separated gas rich in methane is stored in the liquid state under low pressure, and the gas fraction separated under a first intermediate pressure at the top of the separator is condensed by heat exchange with an auxiliary refrigerating fluid.

In the installation shown in FIGURE 4, the liquid natural gas to be freed from heavier hydrocarbons and then re-liquified, arriving by way of the conduit 101, is brought by the pump 102 to a pressure of about 18 bars absolute and is delivered via the conduit 103 to the heat exchanger 104. It is re-heated therein by indirect heat exchange with two liquid fractions rich in methane reaching the cold end of the exchanger via the conduits 110 and 140, respectively, one part originating from stripping rectification column 117 and the other part from a separator 108, which will be hereinafter described. The re-heated liquid natural gas then passes through the conduit 105 to the exchanger 106, where it is partially vaporised by heat exchange with the gas rich in methane at a pressure of about 25 bars absolute, separated at the top of the stripping rectification column 117. It is then introduced through the conduit 107 into the separator 108.

The liquid fraction enriched with hydrocarbons heavier than methane is collected at the bottom of the separator 108, is evacuated therefrom through the conduit 115, and then is brought by the pump 116 to the pressure of 25 bars absolute and introduced into the top of the column 117. This column is heated at its base by a water circulation boiler 121 and in its middle zone by an exchanger 125, heated by the partial condensation of the fluid of the refrigeration circuit which will hereinafter be described in detail. The liquid rich in hydrocarbons heavier than methane, collected in the sump of the column, is drawn off through the conduit 118; one part is sent via the conduit 119 to the installation for separating these hydrocarbons (not shown); another part passes through the conduit 120 to the boiler 121, is vaporised therein and returns through the conduit 122 to the column.

Gas rich in methane is discharged at the top of the column 117, and this gas passes through the conduit 126a to the exchanger 106, where it is re-liquified in heat exchange with the liquid natural gas under a pressure of 18 bars undergoing partial vaporisation. The liquid rich in methane is sent via the conduit 110 to the exchanger 4, where it is sub-cooled to about −160° C. by heat exchange with the liquid natural gas under the intermediate pressure of 18 bars. It is then expanded in the valve 142 to this pressure and re-united in the conduit 112 with the re-liquified gas rich in methane arriving by way of the conduit 141. The combined gases are expanded in the valve 113 to the region of atmospheric pressure and introduced into the heat-insulated storage reservoir 114.

The gas rich in methane and discharged at the top of the separator 108 is introduced through the conduit 109 into the heat exchange zone 127, where it is liquified in heat exchange with the refrigerating fluid of the cycle, which will hereinafter be described. It then passes through the conduit 140 into the exchanger 104, is sub-cooled therein, whereafter it is re-united by the conduit 141 with the gas rich in methane originating from the stripping rectification column 117, in order to be sent therewith for storage in the reservoir 114.

The refrigerating cycle which ensures in the exchange zone 127 the liquefaction of the gas rich in methane leaving the separator 108 is shown diagrammatically at 134. It is preferably a cascade cycle with a mixed refrigeration fluid, comprising mainly methane, ethane and butanes, of the type which forms the subject of the second Certificate of Addition No. 86,485 of the 18th September, 1964 to French Patent No. 1,302,989 of the applicants. The mixed refrigerating fluid under pressure is liquefied by successive heat exchange with water in an exchanger 123, then with a liquid fraction drawn from the central portion of the stripping rectification column 117 through the conduit 124, vaporised at 125 and then sent back to the column through the conduit 126. The most volatile liquid fraction ensures the liquefaction of the gas rich in methane in the exchange zone 127.

Figure 5:
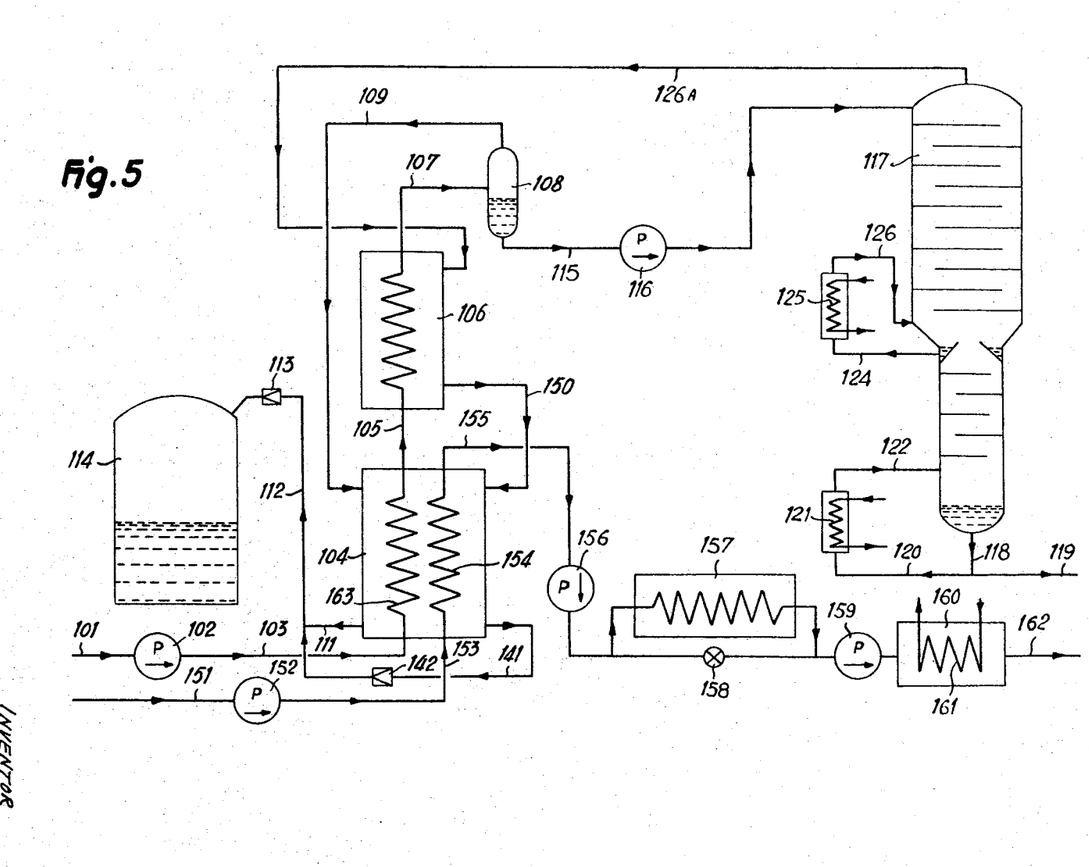
FIGURE 5 shows an installation in which all the separated gas rich in methane is stored in the liquid state under low pressure, and the condensation and the sub-cooling of the two fractions to a temperature near the boiling temperature under the low storage pressure are completed by heat exchange with sub-cooled natural gas, which is warmed up without vaporisation before it is brought by pumping to a high pressure and warmed up again, then supplied to a distribution network by pipe, without separating therefrom of the heavier hydrocarbons than methane.

In the installation shown in FIGURE 5, a part of the liquid natural gas, which may reach up to about 50% of the total and which arrives by way of the conduit 101, is brought to a pressure of about 18 bars absolute and delivered by the pump 102 into a first circuit, which comprises a re-liquefaction and a supply to liquid storage of the separated gas rich in methane. Another part of the liquid natural gas arriving by way of the conduit 151 and the pressurising pump 152 is reheated and then re-vaporised without stripping and sent to the distribution network under pressure.

The first part of the liquid natural gas passes through the conduit 103 into the nest of tubes 163 of the exchanger 104, where it is re-heated without vaporisation, and then through the conduit 105 into the exchanger 106, where it undergoes a partial vaporisation in heat exchange with the gas rich in methane under a pressure of 25 bars coming from the gasoline extracting column 117. It is then introduced via the conduit 107 into the separator 108.

The gaseous fraction discharged at the top through the conduit 109 is liquefied and sub-cooled to $-160°$ C. in the heat exchange zone 104, and is then sent through the conduits 111 and 112 and the expansion valve 113 into the storage reservoir 114.

The remaining liquid fraction, enriched with hydrocarbons heavier than methane, is introduced via the conduit 115 and the pressurising pump 116 to the head of the column 117 under a pressure of 25 bars. This column is heated at its base by a water circulation boiler 121 and in its middle zone by an exchanger 125 in which there is circulation or trickling of water.

As before, a part of the liquid rich in hydrocarbons heavier than methane is sent through the conduit 119 to an installation for the separation of these hydrocarbons, but another part is vaporised in the boiler 121 and returned to the column. The gas rich in methane discharged through the conduit 126a at the top of the column 117 is introduced into the exchanger 106, where it is re-liquefied and then passes through the conduit 150 into the exchanger 104, where it is sub-cooled in the region of $-160°$ C. It is then re-united via the conduit 141 and the expansion valve 142 with the re-liquefied gas coming from the separator 108, and then it is introduced with the latter via the conduit 112 and the expansion valve 113 into the storage reservoir 114.

The second part of the liquid natural gas, intended to be sent to the distribution network under pressure without previous stripping of heavier hydrocarbons, after having been brought by the pump 152 to a pressure of 18 bars absolute, passes through the conduit 153 into the nest of tubes 154 of the exchanger 104, where it is re-heated. It is sent via the conduit 155 to the pump 156, which brings it to a pressure of 70 bars. It is then re-heated in the condensers at the tops of the separation columns for the hydrocarbons heavier than methane, represented diagrammatically by the heat exchange zone 157. A regulation of the supply of cold thus provided can be effected by means of a by-pass valve 158. The natural gas under hypercritical pressure is then delivered by the pump 159 to the heat exchanger 160 having a water circulation represented at 161, and then it flows through the conduit 162 to the distribution network under pressure.

Figure 6:
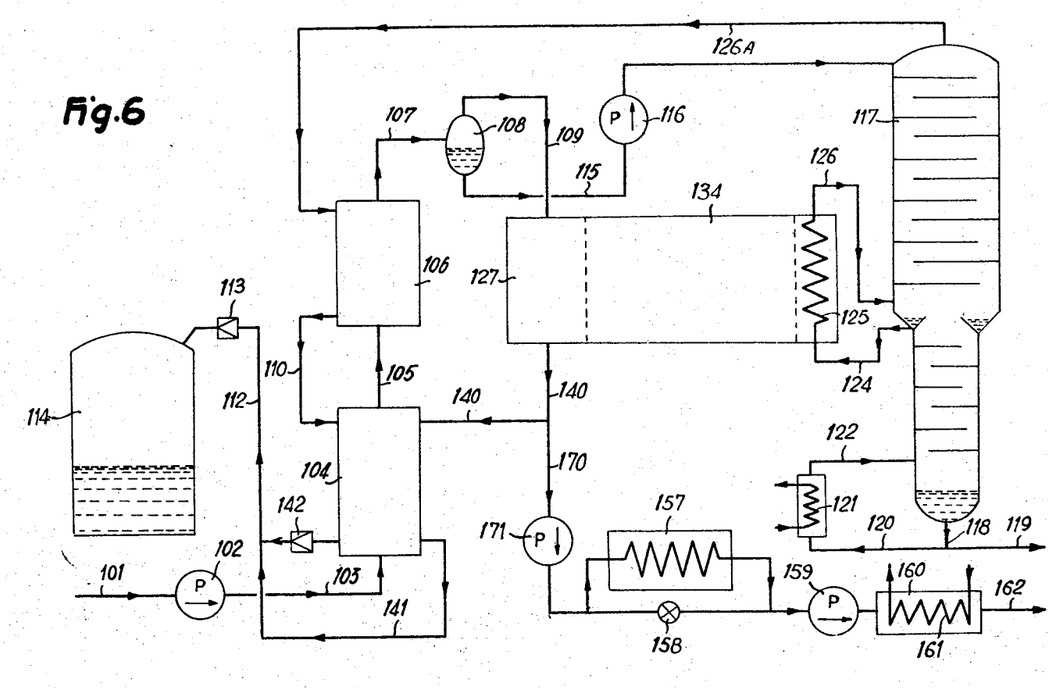
FIGURE 6 shows an installation in which only part of the gaseous fraction separated under a first intermediate pressure at the top of a separator, then condensed by an auxiliary refrigerating cycle, is sub-cooled to about the boiling temperature under the low storage pressure and sent to a storage reservoir, while the other part is brought by pumping to a high pressure and warmed up, then sent to a distribution network by pipe.

The installation shown in FIGURE 6 is to a large extent similar to that of FIGURE 4, and will therefore not be described again in detail. However, only a part of the gaseous fraction rich in methane discharged at the top of the separator 108 and liquefied is sent through the conduit 140 to the exchanger 104 and then to the storage reservoir 114. The other part is sent through the conduit 170 to the pump 171, which brings it to a pressure of 70 bars. It is then re-heated in the condensers at the tops of the separation columns for the hydrocarbons heavier than methane, represented diagrammatically by the heat exchange zone 157. One fraction can be by-passed by the valve 158 in order to regulate the supply of cold in this exchange zone. The partially re-heated fluid rich in methane is finally introduced by the pump 159 into the exchanger 160 with a water circulation 161, in which it is re-heated to the region of ambient temperature before passing through the conduit 162 to the distribution network.

The re-liquefaction of the gas rich in methane leaving the separator 108 is effected in the exchanger 127 by a cascade refrigeration cycle with mixed refrigeration fluid, similar to that of FIGURE 4. The condensation of the least volatile fraction of this refrigerating fluid is assured by exchange of heat in 125 with the liquid withdrawn from the middle zone of the column 117 through the conduit 124 and returned after vaporisation into the latter through the conduit 126.

Various modifications can of course be incorporated in the installations which have just been described without departing from the scope of the invention. In particular, the number of intermediate pressure stages can be higher than three, the residual liquid fraction of natural gas undergoing a pressurisation at the outlet of each separator. The extraction of heavier hydrocarbons from the methane can be assured in several rectifier columns, which can also function under different pressures (the gas rich in methane separated in the column under the lowest pressure could be re-united with the gaseous phase from the separator which functions under the same pressure). The refrigeration cycle intended to assure if desired the complementary supply of cold to the gas rich in methane to be reliquefied can be of any other known type, for example, a cascade cycle with separate circuits of different refrigerating fluids, such as ethane or methane, or a cycle known as a "Claude" cycle with liquefaction of gas by heat exchange with a part of this gas expanded with external work, or even a closed cycle of the Stirling type.

What I claim is:
1. A process for the production of a fluid rich in methane from liquefied natural gas under a low initial pressure, wherein at least part of the hydrocarbons heavier than methane is separated in a residual liquid fraction of the partial revaporisation of the natural gas previously brought in the liquid state to a higher pressure than said low initial pressure, comprising the steps of:
  (a) liquefying a first quantity of gas rich in methane under a first pressure higher than said initial pressure at least partly by heat exchange with sub-cooled liquefied natural gas brought to said first pressure undergoing a warming up;
  (b) liquefying another quantity of gas rich in methane brought to a second pressure higher than said first pressure at least partly by heat exchange with liquefied natural gas still under said first pressure undergoing a partial revaporisation providing a first gaseous fraction and a first liquid fraction, said first gaseous fraction constituting said first quantity of gas rich in methane;
  (c) bringing said first liquid fraction to at least said second pressure; and
  (d) separating said first liquid fraction into a second gaseous fraction and a second liquid fraction, said second gaseous fraction constituting said second quantity of gas rich in methane and said second liquid fraction constituting said residual liquid fraction containing at least part of the hydrocarbons heavier than methane.

2. A process according to claim 1, wherein the two liquefied quantities of gas rich in methane are pumped to a final pressure higher than the pressures under which said quantities were liquefied.

3. A process according to claim 2, wherein said second liquid fraction is separated by rectification in a rectification zone into rectified fractions; and wherein the two quantities of fluid rich in methane under said final pressure are warmed up by heat exchange with said rectification zone, thereby providing at least part of the cold input into said rectification zone.

4. A process according to claim 1, wherein said quantities of gas rich in methane are supplied with an external cold input for completing their liquefaction, and said liquefied quantities are at least in part expanded and supplied to a liquid store at low temperature.

5. A process according to claim 4, wherein the external cold input is provided by a warming up of a stream of sub-cooled liquefied natural gas from which the heavier hydrocarbons than methane are not to be removed.

References Cited
UNITED STATES PATENTS

| | | | |
|---|---|---|---|
| 2,222,275 | 11/1940 | Babcock | 62—30 XR |
| 3,078,686 | 2/1963 | Maher et al. | 62—54 |
| 3,261,169 | 7/1966 | Marmens | 62—28 |
| 3,362,175 | 1/1968 | Burns et al. | 62—28 |

NORMAN YUDKOFF, *Primary Examiner.*

V. W. PRETKA, *Assistant Examiner.*

U.S. Cl. X.R.

62—27, 41, 40, 52, 54